A. A. TIRRILL.
SECURING DEVICE.
APPLICATION FILED APR. 20, 1920.

1,403,655. Patented Jan. 17, 1922.

INVENTOR
Allen A. Tirrill
by William B. Wharton
his attorney

UNITED STATES PATENT OFFICE.

ALLEN A. TIRRILL, OF PITTSBURGH, PENNSYLVANIA, ASSIGNOR TO THE CLAMERT MANUFACTURING COMPANY, OF PITTSBURGH, PENNSYLVANIA, A CORPORATION OF DELAWARE.

SECURING DEVICE.

1,403,655. Specification of Letters Patent. Patented Jan. 17, 1922.

Application filed April 20, 1920. Serial No. 375,330.

*To all whom it may concern:*

Be it known that I, ALLEN A. TIRRILL, a citizen of the United States, and resident of Pittsburgh, in the county of Allegheny and State of Pennsylvania, have invented a new and useful Improvement in a Securing Device, of which the following is a specification.

This invention relates to a securing device, and is particularly designed for use as a holder for automobile license plates and the like.

As a holder for automobile license plates the device constitutes an improvement over that shown and described in the patent to George W. Emmert, No. 1,340,387, dated May 18, 1920.

The present invention has as one object, the provision of an attaching device which will hold a license plate or similar article firmly but without too great a degree of rigidity; and further to provide a device which will secure the plate to a bracket having orifices of any shape therein, and which cannot be accidentally jarred loose or into any position which might cause the plate to be loosened or disengaged from the bracket.

Further objects of the invention are to provide an attaching device in which a shaft is attached to a barrel interiorly thereof, thus avoiding the extension of the shaft beyond the head of the barrel and the use of a rivet head or other externally applied means for securing it thereto. This renders the device more sightly and leaves no joints for the entry of water and consequent rusting of the parts.

A still further object of the invention is to provide a shank and barrel construction and method of making the same, such construction and method being applicable to any device in which a metallic shank is secured to a metallic barrel.

Figure 1:
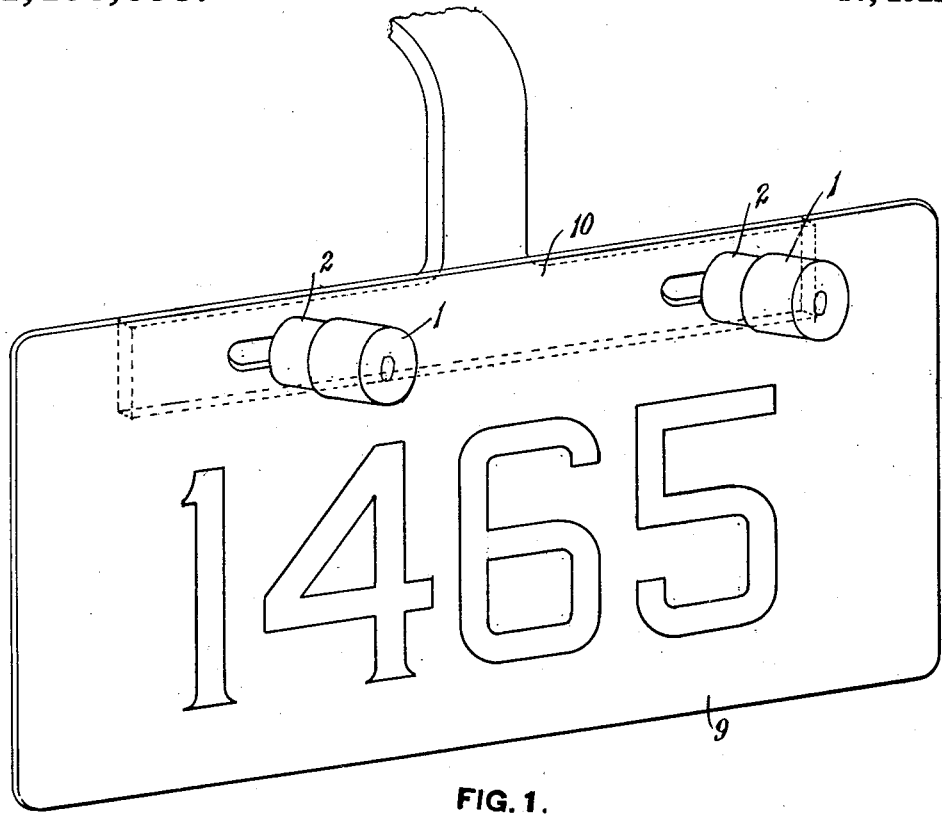
Figure 3:
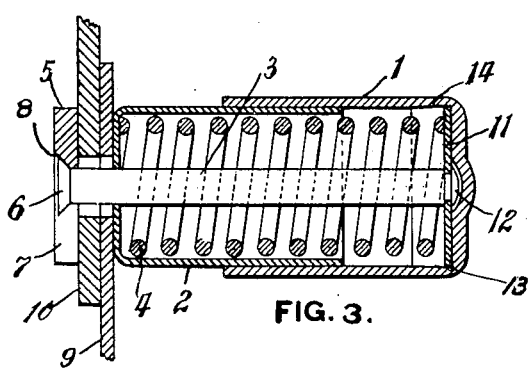
Figure 5:
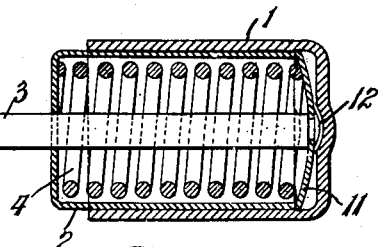
Figure 2:
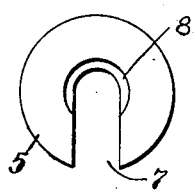
Figure 4:
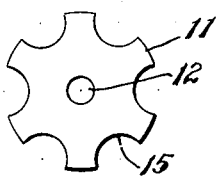

In the accompanying drawings Fig. 1 is an elevation illustrating an automobile license plate held in position by the device of the present invention; Fig. 2 is a plan view of the locking member of the device; Fig. 3 is a central longitudinal section through the device, on an enlarged scale for clear illustration of certain structural details of the device; Fig. 4 is a plan view of a modified form of connecting plate; and Fig. 5 is a longitudinal sectional view illustrating a step in the construction of the device.

The attaching device comprises primarily a casing or barrel 1, a second casing or barrel 2 telescoping within the barrel 1, a shank 3 rigidly secured within barrel 1 and extending through the head of barrel 2, a coiled spring 4, surrounding the shank 3 and bearing against the inner surface of the head of each of the barrels, and a locking member 5 arranged to engage with the shank 3.

The shank 3 is rigidly secured at one extremity to the head of the barrel 1 by means to be hereinafter described, and has at its other extremity a locking head 6, which is of moderate size and which is disposed beyond the head of barrel 2. The locking member 5 is provided with a slot 7 arranged to permit the member to be slipped onto the shank 3, and a countersunk seat 8 arranged to receive the head 6 of the shank.

In applying the attaching device to secure a license plate to a bracket, pressure is applied to the head of barrel 1 so that it slides over barrel 2, and compresses the spring 4. The shank 3 is thus caused to project beyond the head of barrel 2 and may be inserted through the slot or other orifice in plate 9 and through the bolt hole or other orifice in bracket 10 to project a suitable distance beyond the latter. The locking member 5 is then slipped over the shank 3 so that the countersunk seat 8 is in line with the locking head 6 of the shank. By merely releasing the pressure on the barrel 1, the tension of coiled spring 4 will tend to force the barrels 1 and 2 apart as far as the length of the shank 3 will permit. The plate and bracket are thus held securely between the head of barrel 2 and locking member 5 with the locking head 6 secured in position by the countersunk seat 8.

Because of the relatively small size of the locking head 6 of the shank, it can be introduced through either slots or bolt holes in the license plate and bracket; it being necessary to have merely a small registering space between the two apertures. Because, moreover, of the size and shape of locking member 5, it will hold the license plate securely in place whether bolt holes or slots be provided in the bracket.

The device is so designed that it may be used to secure license plates, advertising signs, or the like, to supporting means having therein apertures of varying form; and by merely increasing the size of the locking member, may be used where such apertures are of any desired size.

The device in so far as described above, corresponds to the device described and claimed in the above noted patent to George W. Emmert. The novelty of the present invention resides in the means for and method of securing the shank 3 to the body 1. This is so effected that the shank and its securing means may be formed as a unitary structure, and as such, introduced into the barrel of the device.

The securing member or plate 11 is secured to the shank 3 by means of a rivet head 12 on the shank 3. This plate 11 is preferably composed of metal harder than that of which the barrel is made, and is thinner than the walls of the barrel. The plate is dished with its convex face outward at the end of the shank 3. The plate 11 with shank 3, and the coiled spring 6 surrounding the shank, is then introduced into barrel 1 until the convex face of the plate 11 rests against the inner surface of the head of the barrel. With the convex face of plate 11 in such position, the tubular member, or barrel, 2 is forced downwardly, as by means of a foot press, so that it bears upon the dished plate 11 adjacent its periphery, (as shown in Fig. 5 of the drawings) straightening it out into the flat plate shown in Fig. 3 of the drawings. In this manner, the parts are assembled at one operation to form the completed device.

As plate 11 is straightened out, it will bite slightly into the metal of barrel 1 to firmly anchor the shank 3 in the barrel. This engagement is shown at 13 in Fig. 3 of the drawings. In drawing a barrel, a slightly expanded portion 14 is normally formed adjacent to the head of the barrel. The diameter of plate 11 must therefore, be such that it is of proper size to engage in this expanded portion when straightened out.

If the barrel 1 be formed by a method which will cause it to be of uniform diameter throughout, it is obvious that the true diameter of the plate should be made slightly greater than the diameter of the barrel in order to secure this biting engagement.

Where the shank and the barrel construction is employed in connection with a device other than the securing device, described above, any suitable tubular member may be pressed down upon the plate 11 to straighten it out and to cause it to bite into the metal of the barrel to which the shank is to be secured.

The modified form of retaining plate illustrated in Fig. 4 of the drawings is provided on its periphery with a plurality of notches 14, which permit the plate to be more readily straightened out from the dished form in which it is introduced into the barrel into the flat form in which it engages therewith. This permits the plate 11 to be made of greater thickness than where no such notches are provided.

It will be readily understood that the construction and method by which a metallic shank is secured to a metallic barrel, as described above, is applicable to a number of devices other than a license plate holder. It is particularly desirable in any device in which a movable plunger or follower is arranged to slide upon a fixed shank or shaft, within a casing which surrounds the shaft for any portion of its length.

The means for securing a shank in a barrel permits all the parts to be finished before the assembly of any of them; since the assembling operation is such that the finish of none of the parts can be marred. This causes a great reduction in the work necessary for finishing the parts, and also provides a piece of work which is of higher class than would be possible were the parts finished and assembled by any previous method, or finished after their assembly.

A number of further advantages and practical application of the construction of the present invention will occur to those skilled in the art to which the invention appertains.

What I claim is:

1. A shank and barrel construction comprising a metallic barrel, a shank, and a metallic retaining plate on said shank arranged to enter and engage in said barrel; said plate when engaged being of a diameter greater than the interior diameter of the portion of the barrel in which it engages.

2. A shank and barrel construction comprising a metallic barrel, a shank, and a notched metallic retaining plate on said shank and arranged to enter and engage in said barrel; said plate when engaged being of a diameter greater than the interior diameter of the portion of the barrel in which is engages.

3. The method of securing a shank to a barrel which consists in securing to the shank a dished metallic plate having when flat a diameter greater than the interior diameter of the portion of the barrel in which it engages, introducing said plate and shank into the barrel and exerting pressure upon said plate to straighten the same and cause its periphery to bite into the barrel wall.

4. The method of securing a shank to a barrel which consists in securing to the shank a dished metallic plate having when flat a diameter greater than the interior diameter of the portion of the barrel in which it engages, introducing said plate and shank into the barrel, and forcing a tubular member upon said plate adjacent its periphery to straighten the plate and cause it to bite into the barrel wall.

5. A securing device comprising a pair of telescoping barrels, a headed shank arranged to extend beyond the head of one of said barrels, a coiled spring surrounding said shank and bearing against the heads of said barrels, a metallic plate on said shank arranged to bite into the wall of the other of said barrels, and a locking member arranged to engage on said shank.

6. A securing device comprising a pair of telescoping barrels, a headed shank arranged to extend beyond the head of one of said barrels, a coiled spring surrounding said shank and bearing against the heads of said barrels, a metallic retaining plate on said shank of greater diameter than the portion of the barrel in which it engages and arranged to bite into the wall of the other of said barrels, and a locking member arranged to engage on said shank.

7. A securing device comprising a pair of telescoping metallic barrels, a headed shank arranged to extend beyond the head of one of said barrels, a coiled spring surrounding said shank and bearing against the heads of said barrels, a notched metallic retaining plate on said shank and arranged to engage in the other of said barrels, said plate being of metal harder than the barrel wall and of greater diameter than the portion of the barrel in which it engages, and a locking member on said shank.

In witness whereof, I hereunto set my hand.

ALLEN A. TIRRILL.

Witnesses:
J. M. HOLLIDAY,
E. A. BECKER.